(12) United States Patent
Reznik et al.

(10) Patent No.: US 10,572,841 B2
(45) Date of Patent: Feb. 25, 2020

(54) ACTIONS FOR AN INFORMATION TECHNOLOGY CASE

(71) Applicant: ENTIT SOFTWARE LLC, Sunnyvale, CA (US)

(72) Inventors: Leonid Reznik, Yehud (IL); Yuri Moshayev, Yehud (IL); Yariv Snapir, Yehud (IL); Michael Dikman, Yehud (IL); Dan Noter, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 1533 days.

(21) Appl. No.: 14/266,135

(22) Filed: Apr. 30, 2014

(65) Prior Publication Data

US 2015/0317594 A1    Nov. 5, 2015

(51) Int. Cl.
*G06Q 10/06* (2012.01)

(52) U.S. Cl.
CPC ........... *G06Q 10/063114* (2013.01); *G06Q 10/06395* (2013.01)

(58) Field of Classification Search
CPC ........... G06Q 10/063114; G06Q 10/06395
See application file for complete search history.

(56) References Cited

U.S. PATENT DOCUMENTS

| | | | |
|---|---|---|---|
| 6,571,251 B1 | 5/2003 | Koski et al. | |
| 7,890,802 B2 | 2/2011 | Gerber | |
| 8,266,072 B2 * | 9/2012 | Grace | G06Q 10/063 705/304 |
| 2005/0060217 A1 * | 3/2005 | Douglas | G06Q 10/063112 705/7.14 |
| 2005/0120112 A1 * | 6/2005 | Wing | G06Q 10/06 709/224 |
| 2006/0224408 A1 * | 10/2006 | Veley | G06Q 30/02 705/500 |
| 2008/0098109 A1 | 4/2008 | Faihe et al. | |
| 2008/0155564 A1 * | 6/2008 | Shcherbina | G06Q 10/06 719/318 |
| 2008/0162196 A1 * | 7/2008 | Espinosa | G06Q 10/02 705/5 |
| 2009/0119147 A1 * | 5/2009 | Messer | G06Q 10/10 705/7.14 |
| 2009/0276728 A1 * | 11/2009 | Doan | G06Q 10/10 715/810 |
| 2010/0121688 A1 * | 5/2010 | Marsch | G06Q 10/0639 705/7.38 |
| 2011/0191132 A1 * | 8/2011 | Westcott | G06Q 10/063 705/7.11 |
| 2011/0202380 A1 * | 8/2011 | Vera | G06Q 10/00 705/7.14 |
| 2013/0073557 A1 | 3/2013 | Nezhad et al. | |

(Continued)

OTHER PUBLICATIONS

IBM Case Manager 5.2, "Improve case outcomes by empowering knowledge workers with up-to-date information to make selective decisions", Sep. 15, 2013, 4 pages.

Primary Examiner — Sujay Koneru

(57) ABSTRACT

Recommending actions to an Information Technology (IT) case can include searching an index for an IT case that matches a received IT case, identifying a plurality of actions for the received IT case based on the search, and recommending a subset of actions from the plurality of actions for the received IT case to an IT agent.

17 Claims, 4 Drawing Sheets

(56) References Cited

U.S. PATENT DOCUMENTS

| | | | |
|---|---|---|---|
| 2013/0159039 A1* | 6/2013 | Brech | G06Q 10/06 |
| | | | 705/7.15 |
| 2013/0262504 A1 | 10/2013 | Allgaier | |
| 2014/0032254 A1* | 1/2014 | Della Corte | G06Q 30/016 |
| | | | 705/7.14 |
| 2014/0052645 A1* | 2/2014 | Hawes | G06Q 10/20 |
| | | | 705/304 |
| 2014/0164051 A1* | 6/2014 | Nezhad | G06Q 10/0633 |
| | | | 705/7.27 |
| 2015/0006492 A1* | 1/2015 | Wexler | G06F 17/30864 |
| | | | 707/694 |
| 2015/0019541 A1* | 1/2015 | Carus | G06F 17/30864 |
| | | | 707/723 |
| 2015/0052122 A1* | 2/2015 | Landry | G06F 11/0706 |
| | | | 707/723 |

* cited by examiner

ACTIONS FOR AN INFORMATION TECHNOLOGY CASE

BACKGROUND

Information Technology (IT) can include an application of systems for storing, retrieving, transmitting, and manipulating data. Information Technology (IT) support agents (e.g., a user) can handle multiple IT requests at a given time. An IT agent can, for example, perform a number of searches to find a solution and/or determine how to proceed with a particular IT case.

DETAILED DESCRIPTION

The ability for an IT agent to efficiently and effectively locate a solution for an IT case (e.g., incident, request, etc.) is critical for an organization. IT agents can handle multiple IT requests and/or incidents at a given time. To find a solution, an IT agent can perform a number of searches to determine how to proceed with a particular IT case. An IT agent, as used herein, can include a user, representative, and/or an employee of an organization. For instance, the IT agent can be an employee that answers IT cases over a telephone and/or a computing device.

In some instances, a report and/or an incident may require an IT agent search across a number of different knowledge sources, such as searching for relevant information across different databases and systems, which can require additional time and resources. To provide effective and efficient service to users, an IT agent may desire to quickly find a successful solution. Prior IT approaches may be limited to using company-owned IT knowledge and/or databases, which can lag behind the growing variety of technology used by organization end-users. Once a potential solution is located from the numerous solutions, the chosen solution may be a poor solution.

In contrast, examples of the present disclosure can increase IT agent productivity as compared to prior approaches by providing dynamic actions for IT cases. As used herein, an IT case can include Informational Technology incidents, reports, requests, and/or inquiries, among others. Dynamic actions can include actions that can be updated. The dynamic actions can be achieved by indexing textual fields of multiple IT data sources. IT data sources can include sources of information related to IT. The IT data sources can include a vast array of sources, such as on-premise knowledge artifacts, internal databases, external databases, user driven knowledge, IT knowledge articles, and/or support and service requests, among other sources. An index can reuse existing knowledge of IT agents, decrease the number of searches, and conserve of resources of the organization as compared to individual searching of each IT data source by an IT agent.

Figure 1:
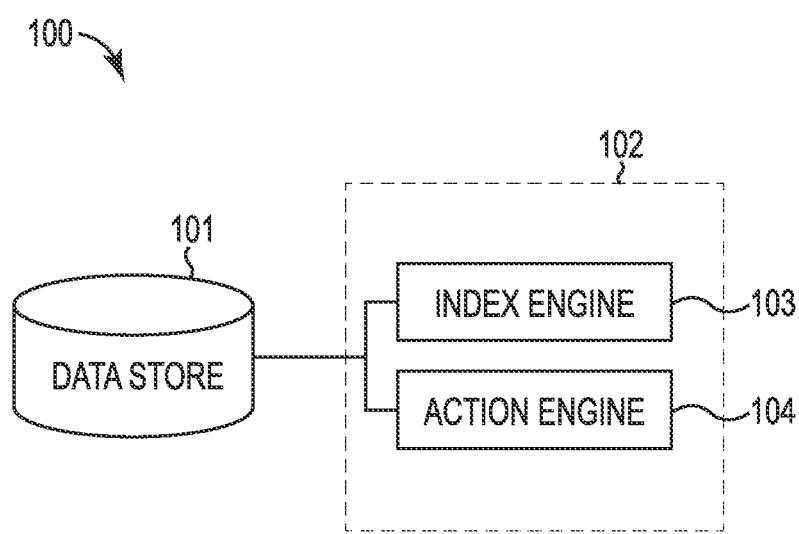
FIG. 1 illustrates an example of a system according to the present disclosure.

FIG. 1 illustrates an example of a system 100 according to the present disclosure. The system 100 can be utilized to index a plurality of IT data sources. The system 100 can include a data store 101, an indexing system 102, and/or a number of engines (e.g., an index engine 103 and an action engine 104). The indexing system 102 can be in communication with the data store 101 via a communication link, and can include the number of engines. The indexing system 102 can include additional or fewer engines than illustrated to perform the various functions described herein.

The index engine 103 and action engine 104 can include a combination of hardware and programming that is configured to perform a number of functions described herein (e.g., index a plurality of IT data sources, search a plurality of IT data sources, provide a list suggestions, recommend an action, etc.). The programming can include program instructions (e.g., software, firmware, etc.) stored in a memory resource (e.g., computer readable medium, machine readable medium, etc.) as well as hard-wired program (e.g. logic). As used herein, an "engine" can include software and/or hardware, but at least includes hardware.

The index engine 103 can include hardware and/or a combination of hardware and programming to create an index of a plurality of IT data sources. An index can include a collection and categorization of IT information from the plurality of IT data sources (e.g., a data structure). For example, the index created can include a plurality of IT information from the plurality of IT data sources categorized based on entity fields. IT data sources can include sources of information related to IT. As used herein, IT data sources can include, but are not limited to, on-premise knowledge management systems, IT knowledge articles, problems, incidents, service offerings, support and service requests, successful resolutions of previous IT cases, business user requests, user driven knowledge, off-premise knowledge management systems, and internal and external database information, among others. In some examples, an IT data source can be an externally stored database. An entity field, as used herein, can include parameters of the IT data source and/or particular data within the IT data source. Example entity fields can include entity type, entity state, the IT service in which the entity is related, entity status, etc.

In some examples, index engine 103 can identify the entity fields to be indexed according to the entity, type, entity state, the IT service in which the entity is related, and/or entity status, among other fields. For example, the system 100 can identify the particular entity (e.g., IT knowledge article, user driven knowledge, etc.) and index the information within the entity to locate the information for future use.

The action engine 104 can include hardware and/or a combination of hardware and programming to search the index for an IT case that matches a received IT case, identify a plurality of actions for the received IT case based on the search, and recommend a subset of actions from the plurality of actions for the received IT case to an IT agent. Searching the index can include searching for and/or retrieving IT information based on query. A query can include search parameters (e.g., information) entered by an IT agent for a IT case Example search parameters for a query can include textual, words, phrases, plain language, connectors, image, entity, and/or topical, etc.

Matching a received IT case can include identifying an IT case that contains at least one matching entity field to the search parameters of the query. For example, the matching IT case can be a related, similar, solved, unsolved, pending, current, incident, request, open, and/or closed IT case, that contains at least one matching field to the search parameters. That is, a matching IT case can include a search result that matches the query.

Identifying a plurality of actions can include ascertaining an action from a matching IT case. The identified action from the matching IT case can be included among a plurality of actions identified from a plurality of matching IT case. For example, a search of the index can identify a matching IT case. From the matching IT case, an action from the matching IT case can be identified. Identifying an action can include an implemented action from a matching IT case. That is, identifying a plurality of actions can include actions from matching IT cases.

The action engine 104 can identify a plurality of actions by calculating a quality score, in some examples. A quality score for an action can be calculated based on a rating score. In some instances, the quality score can be based on user feedback. User feedback, as used herein, can include scoring, ranking, positive/negative, and/or user input. For instance, the subset of actions provided can have a range of quality scores based on the user feedback. One action can have a higher score compared to a different action based on user feedback. The action engine 104 can order the subset of actions based on the quality score of each of the actions in the subset, where the quality score is updated based on a data stream of user feedback. A scalable stream can be a sequence of information that includes user feedback.

In some examples, the action engine 104 can update the plurality of actions based on a scalable stream of user feedback. For instance, the scalable stream of user feedback can be used to revise the quality score of actions. The updating can provide useful, relevant, and/or applicable actions for an IT case.

In some examples, the action engine 104 can recommend the subset of actions to the IT agent based on the quality score of each of the plurality of actions and present the subset of action to the IT agent in a descending order of the quality scores of the subset of actions. Recommending the subset of actions can include providing the subset of actions on a user interface for selection by an IT agent. The recommended subset of actions from the plurality of actions can be based on a quality score. For example, the recommended subset of actions can include actions that meet or exceed a threshold score.

As previously discussed, user feedback can be used to dynamically (e.g., change) update the recommended subset of actions. For instance, an IT case can be sent to an IT agent. The action engine 104 can search the index for a plurality of actions matching the IT case. A subset of actions of the plurality of actions can be recommended to the IT agent. An action of the subset of actions can be implemented in response to a selection of the action by the IT agent. The IT agent can provide feedback after implementation of the action. Based on the feedback (e.g., positive/negative, high/low, rank, etc.), a new search of the index based on the same query as the prior search may result in the action having a different quality score than the previous based on the user feedback. Examples in accordance with the present disclosure are not so limited; the indexing and/or the actions can be more complex, and searching can span the plurality of databases to provide a list of recommended subset of actions.

In various examples, the index engine can include hardware and/or a combination of hardware and programming to search the index for on-premise IT data sources (e.g., wiki systems, dedicated knowledge management products, etc.) and/or off-premise IT data sources. For example, searching the textual field based on entity type can provide an article from an IT data source matching the entity field selected (e.g., a specific non-publicly accessible database).

In some examples, the action engine 104 can notify an IT agent of an IT case in response to at least one entity field matching the query. As used herein, notification can be a text, icon, and/or graphical indication presented in a user interface to the IT agent that initiated the index search. For example, the notification can include a link, an alert, a text box, and/or a graphical icon, among other notifications. For instance, an IT agent may receive an IT case and in response, the index can be searched via a textual search of an entity field. A matching IT case can be identified based on the search of the entity field and a notification can be provided on a user interface.

Figure 2:
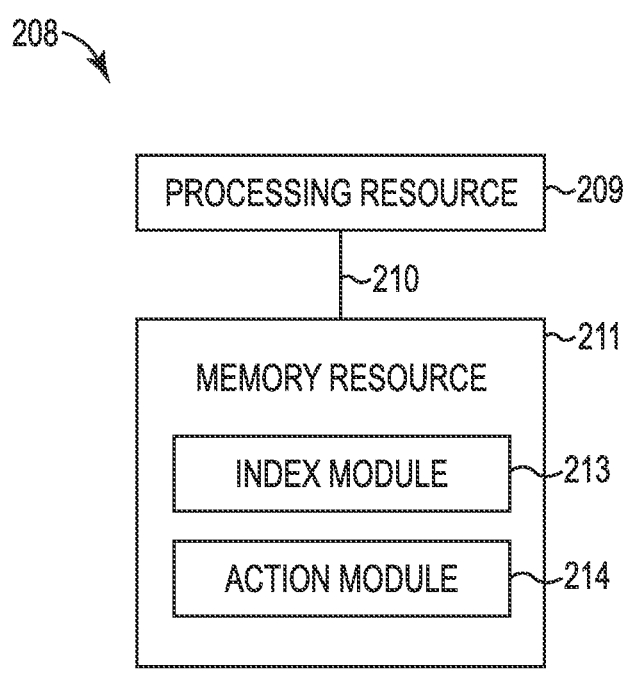
FIG. 2 illustrates an example of a computing device according to the present disclosure.

FIG. 2 illustrates an example of a computing device 208 according to the present disclosure. The computing device 208 can utilize software, hardware, firmware, and/or logic to perform a number of functions described herein.

The computing device 208 can be any combination of hardware and program instructions configured to share information. The hardware, for example, can include a processing resource 209 and/or a memory resource 211 (e.g., computer-readable medium (CRM), machine readable medium (MRM), database, etc.). A processing resource 209, as used herein, can include any number of processors capable of executing instructions stored by a memory resource 211. Processing resource 209 may be integrated in a single device or distributed across multiple devices. The program instructions (e.g., computer-readable instructions (CRI)) can include instructions stored on the memory resource 211 and executable by the processing resource 209 to implement a particular function (e.g., recommend a subset of actions from a plurality of actions).

The memory resource 211 can be in communication with a processing resource 209. A memory resource 211, as used herein, can include any number of memory components capable of storing instructions that can be executed by processing resource 209. Such memory resource 211 can be non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules (e.g., the index module 213 and the action module 214) can include CRI that when executed by the processing resource 209 can perform a number of functions. The number of modules can be sub-modules of other modules. For example, the index module 213 and the action module 214 can be sub-modules and/or contained within a different module. In another example, the number of modules can comprise individual modules at separate and distinct locations (e.g., CRM, etc.). As used herein, a "module" can include software and/or hardware, but at least includes software.

Each of the number of modules can include instructions that when executed by the processing resource 209 can function as a corresponding engine as described herein. For example, the index module 213 can include instructions that when executed by the processing resource 209 can function as the index engine 103. In another example, the action module 214 can include instructions that when executed by the processing resource 209 can function as the action engine 104.

In various examples, the index module 213 can index (e.g. collection, categorization) a plurality of IT data sources. The action module 214 can identify a plurality of actions for a received IT cases based on a search of an index (e.g., textual search of an entity field). The action module 214 can calculate a quality score for each of the plurality of actions. In some examples, the action module 214 can provide a subset of actions from the plurality of actions for the received IT case to an IT agent (e.g., user) based on the quality scores (e.g., threshold score) of the subset of actions.

Figure 3:
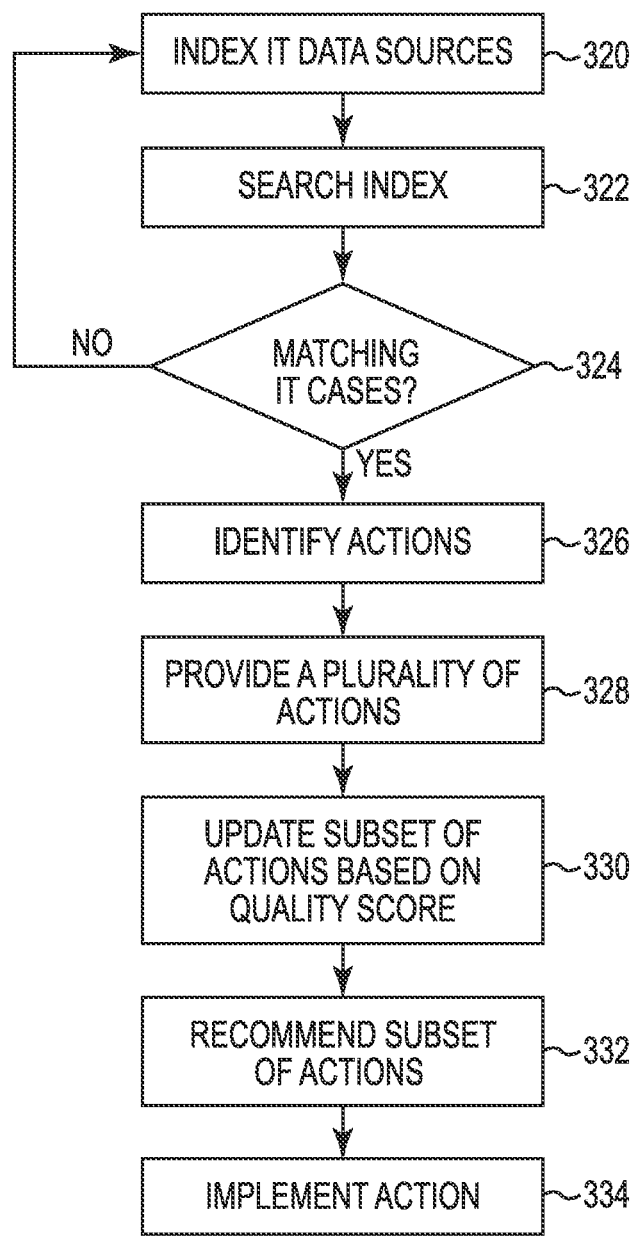
FIG. 3 illustrates a flow diagram of an example of a process for providing actions for an IT case according to the present disclosure.

FIG. 3 illustrates a flow diagram of an example of a process for providing actions for an IT case according to the present disclosure. At 320, a plurality of IT sources can be indexed. The IT data sources can be computer files, data streams, forums, and/or databases, among other sources. The plurality of IT sources can be indexed (e.g., compiled and categorized) based on entity fields. An IT data source can, for example, have multiple entity fields (e.g. parameters) indexed. In some examples, a question and answer (Q&A) forum can be indexed based on topic, source, and textual content. For instance, the Q&A forum may contain a question with a confirmed answer. Both the question and answer can be indexed, for example.

The index can be searched (e.g., entity field, textual search, etc.) for matching (e.g., relevant, similar IT question and/or problem, etc.) IT cases, at 322. The search can be narrowed and/or limited by including additional search parameters. Parameters can include entity fields, such as source, topic, and/or other parameters such as a number of actions (e.g., results), threshold quality score, etc. For example, the search may establish the IT data source to be searched (e.g., private database), a specific topic, and/or a maximum number of actions to provide (e.g., display on a user interface).

Whether a matching IT case is identified can be determined at 324. A match can include a matching entity field to a search parameter. If a matching IT case is not identified, the index can be searched using new search parameters. In various examples, a search of the index can be repeated for multiple iterations until a match is identified.

Alternatively, if a match is not identified within a predetermined period of time, the received IT case can be deemed "open". An open IT case can include a case (e.g., incident, report, request, etc.) that has not been resolved, addressed and/or received a solution or action. For example, the index can be searched for an entity field related to the received IT case. Based on the search of the entity field, a new search can begin if the received IT case does not match an IT case based on the specific entity field search. The new search can include a different search parameter.

In response to identifying an IT case that matches a received IT case, a plurality of actions can be identified at 326. The IT case matches can provide action information relevant to solving IT cases and/or recommending actions for IT cases. The plurality of actions can, for instance, be associated with one or more IT cases. For example, a search for a matching IT case based on a search for a case may identify an identical IT case matching the received IT case. Within the IT case, action(s) can be identified. In some examples, an IT case can match a received IT case, and a solution for the received IT case can be provided from a solution of the IT case (e.g., a solution that solved the IT case).

At 328, a subset of actions from the plurality of actions can be provided on a user interface (e.g., to an IT agent). The subset of actions can include a portion of the plurality of actions. The subset of actions provided to the IT agent can be provided based on a quality score. The quality score can be calculated based on entity fields matching the search query and/or user feedback. For instance, the quality score can reflect an IT agent's experience related to a specific action.

For example, the subset of actions can include actions among the plurality of actions with the highest quality score and/or above a threshold score. In various examples, an IT agent can designate the threshold score. The threshold score can be revised at a subsequent index search.

At 330, the subset of actions can be updated based on a revised quality score. A quality score can be calculated for each action in the subset of actions. The revised quality score can be based on a comparison of each action within the subset of actions in response to an update to the index. For instance, the index can be updated with new data and/or user feedback related to prior data (e.g., ranking, scoring, positive/negative, etc.). The revised quality score can be calculated and/or aggregated from a plurality of updates to the index (e.g., a plurality of user feedback).

An action can be recommended based on a highest quality score (e.g., highest calculated quality score, highest feedback score based on user input, etc.) among the subset of actions. An IT agent may score or report that a particular action was useful, non-useful, satisfactory, unsatisfactory, successful, non-successful, helpful, non-helpful, and/or relevant to the IT incident. Based on the user feedback, a quality score for the particular action can be revised. The revised quality score can reflect whether each action from the subset of actions addressed, solved, and/or answered a received IT case.

In various examples, the plurality of actions can be dynamically listed based on a scalable stream of user feedback. The scalable stream can be a sequence of information that includes user feedback. Dynamically listing can include updating the list of plurality of actions based on the scalable stream of user feedback. That is, dynamically listing can provide a relevant and up-to-date list for selection. For instance, the scalable stream of user feedback can be used to revise the quality score of actions. Based on the feedback, the dynamic list can provide useful, relevant, and/or applicable listed actions for an IT case.

At 332, a subset of actions from the plurality of actions can be recommended to the IT agent. In some examples, the subset of actions can be presented in descending and/or ascending order based on quality score. An action from the subset of actions can be selected by user input (e.g., by the IT agent). The user input can include the IT agent selecting a link, an icon, and/or highlighting the action, among other user inputs.

In some examples, the selected action can be automatically selected based on a quality score of each of the subset of actions. For instance, the action possessing the highest quality score among the subset of actions may be automatically selected. The IT agent can, for instance, provide user feedback to select a different action.

The selected action can be implemented at 334. For instance, a subset of actions listed in descending order based on the quality score can be provided to an IT agent. An action can be selected from the provided list and implemented.

In various examples, user feedback can be provided by an IT agent based on the selected and implemented action. For instance, an IT agent can provide user feedback regarding the implemented action. The provided user feedback can be used to dynamically update the index. The dynamic update can factor a plurality of user feedback to actions and/or IT cases stored in the index. The dynamic update can advantageously identify a subset of actions that is likely useful, applicable, and/or solves a received IT case and/or can be used to provide a revised subset of actions for a received IT case (e.g., a received IT case with a subset of actions identified and the subset can be revised).

Figure 4:
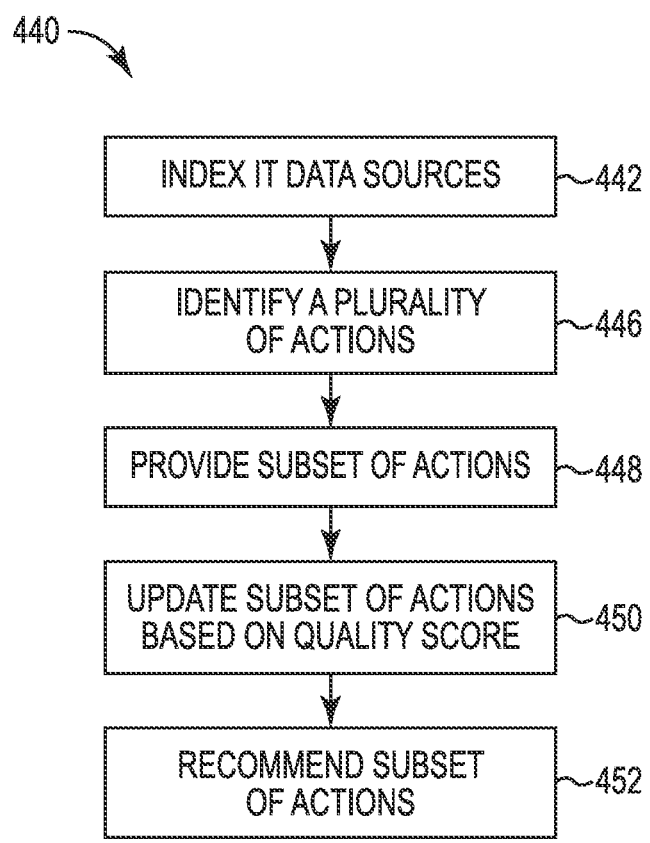
FIG. 4 illustrates a flow diagram of an example of a method for providing actions for an IT case according to the present disclosure.

FIG. 4 illustrates a flow chart of an example of a method 440 for providing actions for an IT case according to the present disclosure. At 442, the method 440 can include indexing a plurality of IT data sources based on entity fields of the plurality of IT data sources. Indexing of the IT data sources can be based on multiple entity fields. For example, indexing can consist of categorizing the topic, source, textual content, and/or entity.

At 446, the method 440 can include identifying a plurality of actions for a received IT case based on a search of the index. The plurality of actions can include a set of instructions, an answer, a step-by-step guide, and/or example steps/actions for a received IT case.

In various examples, the method 440 can include searching the index. Searching the index can include, for example, a textual search of search parameters (e.g., entity fields, such as entity, type, entity state, the IT service in which the entity is related, entity status, etc). The search of the index can be limited to a predetermined period of time and/or can occur in multiple iterations, in some examples.

At 448, the method 440 can include providing a subset of actions from the plurality of actions for the received IT case based on a quality score of the subset of actions. The subset can be provided, for instance, on a user interface to an IT agent. The subset of actions can be a list of actions associated with actions from matching IT cases. Each action from the subset of actions can have a quality score. The matching IT cases can have different actions. The different actions can be associated with matching IT cases and can provide alternative actions for a received IT case.

In some examples, the subset of actions from the plurality of actions can be limited to a specific number of results. In various examples, identifying a plurality of actions can include matching an entity field (e.g., an IT case description) of the received IT case with an entity field of the IT data source. For instance, the entity field of the received IT case can match the entity field within a different and/or related IT cases. The matching IT cases can provide a plurality of actions.

At 450, the method 440 can include updating the subset of actions from the plurality of actions based on a revised quality score. Updating the quality score can be based on user feedback (e.g., ranking, rating, scoring, etc.). The revised quality score can be calculated for each action in the subset of actions (e.g., a calculated quality score for each action), for the plurality of actions, and/or for actions not previously identified. The revised quality score can be based on a comparison of an indexed action in response to user feedback (e.g., ranking, scoring, positive/negative, etc.). The revised quality score can reflect an aggregated quality score from a plurality of user feedback, in some examples. That is, updating the subset of actions from the plurality of actions can be based on user feedback. For example, a user may score a particular action, resulting in a higher or lower quality score for the particular action.

At 452, the method 440 can include recommending the updated subset of actions from the plurality of actions for the received IT case to an IT agent. The subset of actions can be recommended via list formation. The recommended subset of actions can be ordered based on the revised quality score.

In some examples, an action from the subset of actions can be selected. The selected action can be based on the revised quality score assigned to the selected action (e.g., score assigned to each action, etc.). As an example, the list containing the subset of actions can be provided on a user interface and the IT agent can select an action from the list.

In various examples, the selected action can be implemented. Implementation can include performing a specific task, facilitating a stage of a task, and/or executing a portion of a task. For example, the received IT case can include a problem, incident, request, inquiry, and/or question, etc. The implemented action can solve, address, answer, guide, and/or resolve, etc., the received IT case.

As an example, the action and/or plurality of actions provided for implementation can include an article (e.g., step-by-step instructions, etc.). As another example, the received IT case can be a user question, and the matching IT case can include a matching user question and answer. In some examples, the received IT case can relate to a service offering. For instance, the received IT case may involve a question regarding a particular service. In such an instance, an indexed service catalog (e.g., item, part, pamphlet, etc.) can be searched, and an action can include a service ordered and offered to a user (e.g., a person the IT agent is assisting).

The implemented action can be subject to user feedback. The user feedback can be aggregated among a plurality of user feedback associated with the implemented action. The aggregation of user feedback can be used to dynamically update the action for future use.

In some examples, a received IT case may connect to an IT case that is "open". An open IT case can include an unsolved case, unaddressed case, and/or a case in which no action has been taken. In some examples, the open IT case can be related to the received IT case. For instance, a search of the index for a received IT case may notify the IT agent of the open IT case. Notifying the IT agent of the open IT case can include a text box, icon, and/or screen on a user interface associated with the IT agent that identifies the open IT case. Once the received IT case has an action implemented, the open IT case can have the same action implemented. In various examples, the IT agent that initiated the search can assign the received IT case to the different IT agent. The different IT agent can include a particular IT agent that previously handled the open IT case.

A number of examples can include locating an IT case that is "closed." A closed IT case can include an IT case in which an action has been implemented. The implemented action can be determined to have solved, addressed, answered, or resolved the closed IT case. The implemented action may have received user feedback. Based on the user feedback, the action can possess a high quality score among a plurality of actions. In some examples, the same action implemented for the closed IT case can be provided to the IT agent to solve the received IT case.

In the preceding detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

As used herein, "a" or "a number of" something can refer to one or more such things. For example, "a number of network devices" can refer to one or more network devices.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system comprising:
   a processor; and
   a non-transitory storage medium storing instructions executable on the processor to:
   index a plurality of Information Technology (IT) data sources in an index;
   receive a first IT case to be handled by an IT agent;
   responsive to a receipt of the first IT case, search the index for one or more IT cases that match the received first IT case, wherein the one or more IT cases include an open IT case;
   identify a plurality of actions for the received first IT case based on the one or more IT cases;
   provide a recommended subset of actions from the plurality of actions for the received first IT case to the IT agent;
   based on feedback regarding actions that have been implemented to address IT cases, dynamically update the recommended subset of actions for the received first IT case;
   responsive to a selection by the IT agent of a first action from the recommended subset of actions, perform the first action for the received first IT case; and
   responsive to a performance of the first action for the received first IT case, perform the first action for the open IT case of the one or more IT cases.

2. The system of claim 1, wherein the instructions are executable on the processor to:
   search the index for the one or more IT cases using a search parameter in a query produced based on the received first IT case; and
   identify the open IT case in response to at least one entity field of an IT data source among the plurality of IT data sources matching the search parameter.

3. The system of claim 1, wherein the instructions are executable on the processor to:
   recommend the recommended subset of actions to the IT agent based on a quality score of each of the plurality of actions; and
   cause presentation of the recommended subset of actions in a user interface in an order of the quality scores of the actions in the recommended subset of actions.

4. The system of claim 1, wherein the instructions are executable on the processor to:
   order the recommended subset of actions based on a quality score of each of the actions in the recommended subset of actions; and
   update the quality scores of the actions in the recommended subset of actions based on a stream of user feedback.

5. The system of claim 4, wherein the instructions are executable on the processor to update the plurality of actions based on the stream of user feedback.

6. The system of claim 1, wherein the instructions are executable on the processor to identify the plurality of IT data sources to index based on an entity field.

7. A non-transitory computer readable medium storing instructions executable by a processing resource to:
   search an index for one or more Information Technology (IT) cases that match a query containing search parameters for a received first IT case to be handled by an IT agent, wherein the index includes a plurality of IT data sources, wherein the one or more IT cases include an open IT case;
   identify a plurality of actions for the received first IT case based on the one or more IT cases;
   calculate a quality score for each of the plurality of actions;
   in response to the query, provide a subset of actions from the plurality of actions for the received first IT case to the IT agent based on the quality scores for the subset of actions;
   responsive to user feedback regarding actions taken to address IT cases, dynamically update the subset of actions for the received first IT case;
   responsive to a selection by the IT agent of a first action from the subset of actions, perform the first action for the received first IT case; and
   responsive to a performance of the first action for the received first IT case, perform the first action for the open IT case of the one or more IT cases.

8. The non-transitory computer readable medium of claim 7, wherein the instructions executable to search the index for the one or more IT cases include instructions executable to notify the IT agent of the received first IT case.

9. The non-transitory computer readable medium of claim 7, wherein the instructions are executable to recommend an action among the subset of actions based on a highest quality score among quality scores computed for actions in the subset of actions.

10. The non-transitory computer readable medium of claim 7, wherein the instructions are executable to implement a selected action from the subset of actions to address the received first IT case.

11. A method comprising:
    indexing, by a system comprising a processor, a plurality of Information Technology (IT) data sources in an index based on entity fields of the plurality of IT data sources;
    receiving, by the system, a first IT case to be handled by an IT agent;
    responsive to a receipt of the first IT case, search the index for one or more IT cases that match the received first IT case, wherein the one or more IT cases include a second IT case;

identifying, by the system, a plurality of actions for the received first IT case based on the one or more IT cases;

recommending, by the system to the IT agent, a subset of actions from the plurality of actions for the received first IT case based on quality scores computed for the actions in the subset of actions;

updating, by the system, the subset of actions from the plurality of actions based on revised quality scores computed in response to user feedback regarding actions implemented to address IT cases;

recommending, by the system to the IT agent, the updated subset of actions from the plurality of actions for the received first IT case;

responsive to a selection by the IT agent of a first action from the updated subset of actions, performing, by the system, the first action for the received first IT case; and responsive to a performance of the first action for the received first IT case, performing, by the system, the first action for the second IT case of the one or more IT cases.

12. The method of claim 11, wherein identifying the plurality of actions includes matching an entity field of an index entry to a search parameter in a query submitted based on the received first IT case, wherein recommending the subset of actions, updating the subset of actions, and recommending the updated subset of actions are responsive to the query.

13. The method of claim 11, further comprising:
assigning a quality score to each action within the plurality of actions;
revising the quality scores based on the user feedback.

14. The method of claim 11, wherein the search is based on a query submitted for the received first IT case.

15. The system of claim 1, wherein the instructions are executable on the processor to receive feedback from the IT agent regarding an implemented action of the recommended subset of actions, wherein the dynamically updating of the recommended subset of actions is based on the feedback from the IT agent regarding the implemented action.

16. The non-transitory computer-readable medium of claim 7, wherein the instructions are executable by the processing resource to:
receive feedback from the IT agent regarding an implemented action of the subset of actions,
wherein the dynamically updating of the subset of actions is based on the feedback from the IT agent regarding the implemented action.

17. The method of claim 11, further comprising:
receiving, by the system, feedback from the IT agent regarding an implemented action of the subset of actions,
wherein the updating of the subset of actions is based on the feedback from the IT agent regarding the implemented action.

* * * * *